US009338785B2

(12) United States Patent
Frederiksen et al.

(10) Patent No.: US 9,338,785 B2
(45) Date of Patent: May 10, 2016

(54) SYSTEM PERFORMANCE

(75) Inventors: Frank Frederiksen, Klarup (DK);
Klaus Ingemann Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/399,999

(22) PCT Filed: May 10, 2012

(86) PCT No.: PCT/EP2012/058673
§ 371 (c)(1),
(2), (4) Date: Jan. 19, 2015

(87) PCT Pub. No.: WO2013/167191
PCT Pub. Date: Nov. 14, 2013

(65) Prior Publication Data
US 2015/0163812 A1    Jun. 11, 2015

(51) Int. Cl.
*H04W 72/04*  (2009.01)
*H04L 12/24*  (2006.01)
*H04L 5/00*   (2006.01)

(52) U.S. Cl.
CPC ........ *H04W 72/0493* (2013.01); *H04L 41/0896* (2013.01); *H04W 72/0426* (2013.01); *H04L 5/0048* (2013.01); *H04L 5/0053* (2013.01); *H04L 5/0096* (2013.01)

(58) Field of Classification Search
CPC .................. H04W 72/0493; H04W 72/0426; H04L 41/0896; H04L 5/0048
USPC ......... 455/450, 436–439, 442, 444, 464, 507, 455/509; 370/331, 332
See application file for complete search history.

(56) References Cited

U.S. PATENT DOCUMENTS

| 2010/0184432 | A1* | 7/2010 | Yano | H04W 36/12 455/435.1 |
| 2010/0322193 | A1* | 12/2010 | Hu | H04B 7/155 370/331 |
| 2011/0103243 | A1* | 5/2011 | Larsson | H04L 5/001 370/252 |
| 2013/0217407 | A1* | 8/2013 | Gerlach | H04W 28/08 455/453 |

OTHER PUBLICATIONS

3GPP TSG-RAN WG1 Meeting #66bis, Zhuhai, China, Oct. 10-14, 2011, R1-113477, "Additional carrier types for R11 CA Enhancements", InterDigital Communications, LLC, 4 pgs.
3GPP TSG RAN WG1 Meeting #68, Dresden, Germany, Feb. 6-10, 2012, R1-120271, "On the Configuration and Usage of New Carrier Types", Apple Inc., 6 pgs.

(Continued)

*Primary Examiner* — Cong Tran
(74) *Attorney, Agent, or Firm* — Harrington & Smith

(57) ABSTRACT

A technique for improving system performance, including sending from a first access node to one more other access nodes neighboring said first access node a communication about a change in configuration for at least one set radio resources between a plurality of configurations including a first configuration accessible to a first category of communication devices and a second configuration accessible to both said first category and a second category of communication devices.

17 Claims, 4 Drawing Sheets

(56) References Cited

OTHER PUBLICATIONS

3GPP TS 36.211 V12.2.0 (Jun. 2014), "3$^{rd}$ Generation Partnership Project; Technical Specification Group Radio Access Network; Evolved Universal Terrestrial Radio Access (E-UTRA); Physical channels and modulation (Release 12)", 121 pgs.

3GPP TS 36.211 V10.4.0 (Dec. 2011); 3rd Generation Partnership Project; Technical Specification Group Radio Access Network; Evolved Universal Terrestrial Radio Access (E-UTRA); Physical Channels and Modulation (Release 10), (101 pages).

* cited by examiner

SYSTEM PERFORMANCE

Cellular radio communication systems typically involve configuring sets of radio resources for communications between an access node and communication devices within the coverage area of the access node.

It has been proposed to adopt new, different configurations for some of the sets of radio resources available to an access node, with the aim of improving performance by reducing overhead and interference.

Some proposed new configurations may render the respective sets of radio resources unaccessible to a less-advanced class of communication devices that could otherwise access the sets of radio resources if configured according to a less advanced configuration.

In a cellular radio communication system according to such a proposal, the inventors for the present invention have identified the challenge of improving the performance of the cellular radio communication system as a whole.

There is hereby provided a method, comprising: sending from a first access node to one more other access nodes neighbouring said first access node a communication about a change in configuration for at least one set radio resources between a plurality of configurations including a first configuration accessible to a first category of communication devices and a second configuration accessible to both said first category and a second category of communication devices.

In one embodiment, said communication comprises a request to said one or more neighbouring access nodes to change the configuration of one or more sets of radio resources to said second configuration; and the method comprises making said request in response to an identification at said first access node of said neighbouring access node as a potential target access node for the handover from said first access node to said neighbouring access node of a communication device belonging to said second category of communication devices.

There is also hereby provided an apparatus comprising: a processor and memory including computer program code, wherein the memory and computer program code are configured to, with the processor, cause the apparatus to: send from a first access node to one more other access nodes neighbouring said first access node a communication about a change in configuration for at least one set radio resources between a plurality of configurations including a first configuration accessible to a first category of communication devices and a second configuration accessible to both said first category and a second category of communication devices.

In one embodiment, said communication comprises a request to said one or more neighbouring access nodes to change the configuration of one or more sets of radio resources to said second configuration; and the memory and computer program code are further configured to, with the processor, cause the apparatus to: make said request in response to an identification at said first access node of said neighbouring access node as a potential target access node for the handover from said first access node to said neighbouring access node of a communication device belonging to said second category of communication devices.

There is also hereby provided a computer program product comprising program code means which when loaded into a computer controls the computer to: send from a first access node to one more other access nodes neighbouring said first access node a communication about a change in configuration for at least one set radio resources between a plurality of configurations including a first configuration accessible to a first category of communication devices and a second configuration accessible to both said first category and a second category of communication devices.

In one embodiment, said communication comprises information about a decision at said first access node to make a change in configuration for said at least one set of radio resources.

In one embodiment, said communication comprises information about the timing of the change in configuration for said at least one set of radio resources.

In one embodiment, said communication comprises a single message including information about the configuration for a plurality of sets of radio resources.

In one embodiment, said second configuration comprises allocating part of said set of radio resources to the transmission of reference signals required by said second category of communication devices to access control signalling or data carried on said set of radio resources.

In one embodiment, said second configuration comprises allocating part of said set of radio resources to the transmission of control signalling required by said second category of communication devices to access user data carried on said set of radio resources.

Embodiments of the present invention are described in detail hereunder, by way of example only, with reference to the accompanying drawings, in which.

Embodiments of the invention are described in detail below, by way of example only, in the context of a cellular network capable of operating in accordance with the 3GPP Long Term Evolution (LTE) standard, which was first specified in the Release 8 document series of the 3rd Generation Partnership Project (3GPP), and enhancements of which are specified in the Release 9 and 10 document series. This standard is referred to below as LTE Rel-8/9/10.

Figure 1:
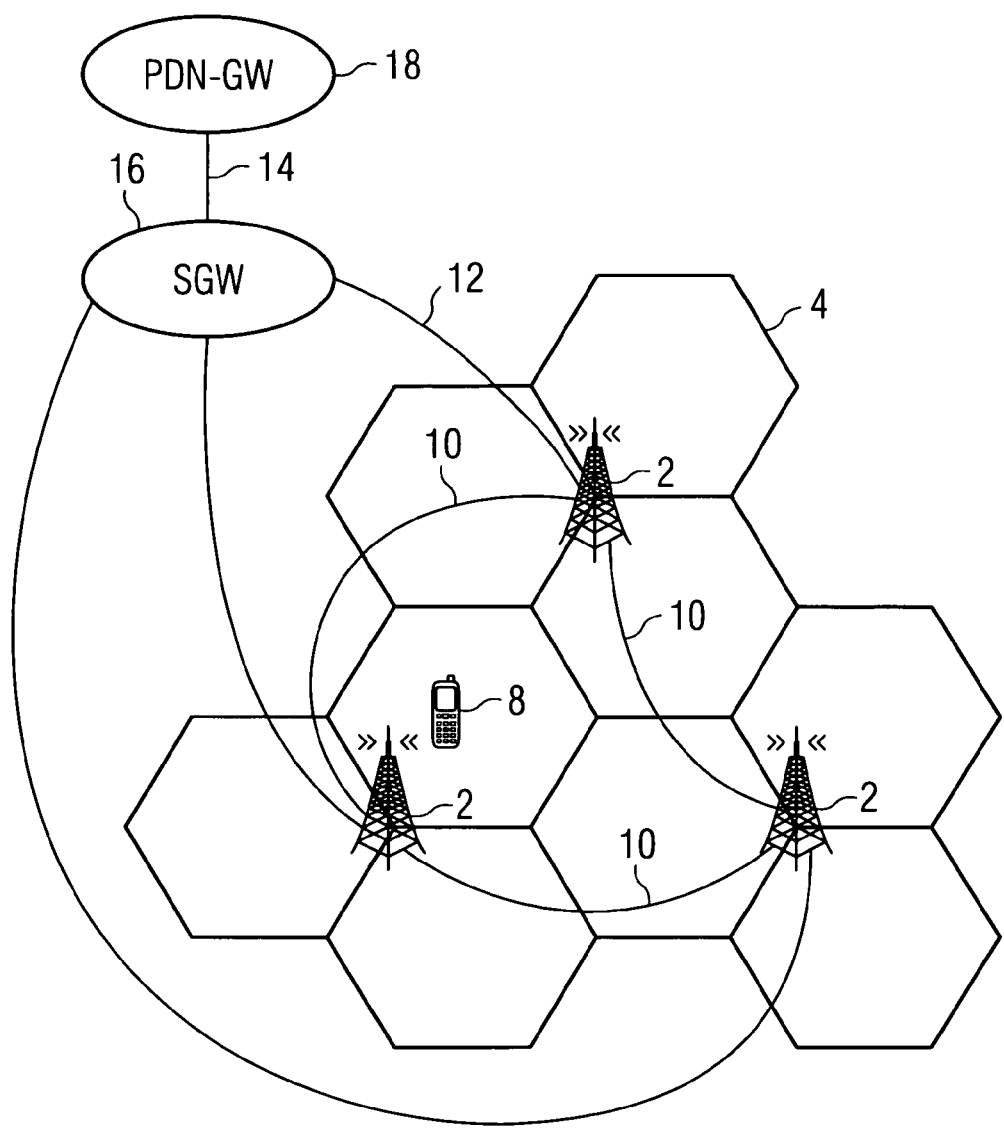
FIG. 1 illustrates an example of a cellular network in which an embodiment of the present invention is implemented.

FIG. 1 illustrates an example of a cellular network in which embodiments of the present invention can be implemented. The cellular network includes cells 4 with transceivers at eNodeBs (eNBs). Only nine cells are shown in FIG. 1, but a mobile telecommunication network will typically comprise tens of thousands of cells. Each eNB 2 is connected by respective wired S1u links 12 to a serving gateway (SGW) 16 which routes and forwards user data packets, and functions as a mobility anchor during inter-eNB handovers. SGW 16 is connected to a packet data network gateway (PDN-GW) 18 via a wired S5 link 14. PDN-GW 18 provides connectivity to external data packet networks. Each eNB 2 is also connected directly to its neighbouring eNBs (i.e. other than via the SGW 16) by wired X2 links.

Figure 2:
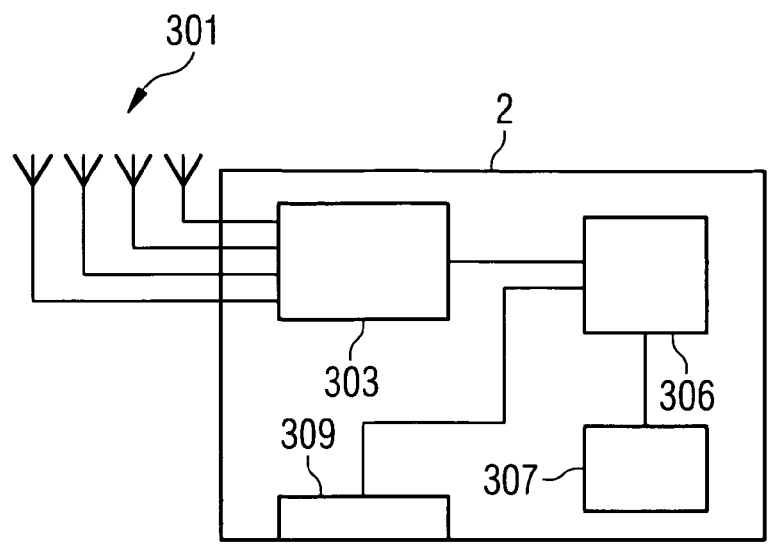
FIG. 2 illustrates an example of apparatus for use at user equipment in FIG. 1.

FIG. 2 shows a schematic view of an example of user equipment 8 that may be used for communicating with the eNBs 2 of FIG. 1 via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals to or from the eNBs 2 of FIG. 1. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part and associated antenna arrangement. The antenna arrangement may be arranged internally or externally to the UE 8.

The UE 8 may be provided with at least one data processing entity 203 and at least one memory or data storage entity 217 for use in tasks it is designed to perform. The data processor 213 and memory 217 may be provided on an appropriate circuit board 219 and/or in chipsets.

The user may control the operation of the UE 8 by means of a suitable user interface such as key pad 201, voice commands, touch sensitive screen or pad, combinations thereof or the like. A display 215, a speaker and a microphone may also be provided. Furthermore, the UE 8 may comprise appropriate connectors (either wired or wireless) to other devices and/or for connecting external accessories, for example hands-free equipment, thereto.

Figure 3:
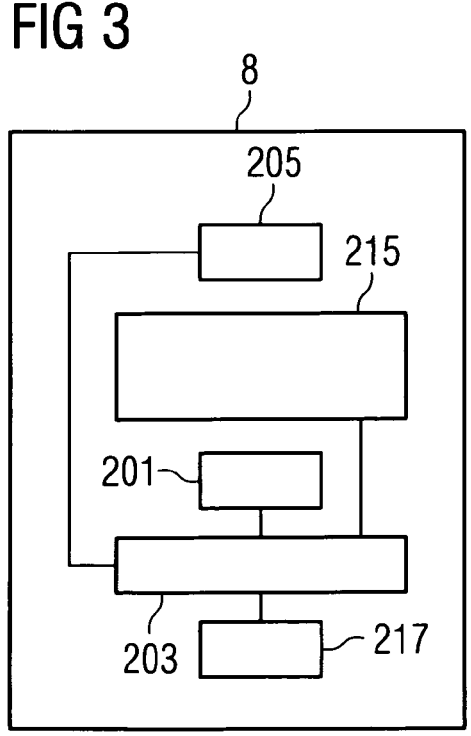
FIG. 3 illustrates an example of apparatus for use at eNodeB in FIG. 1.

FIG. 3 shows an example of apparatus for use at the eNBs 2 of FIG. 1 and for serving the cell 4 in which UE 8 is located. The apparatus comprises a radio frequency antenna array 301 configured to receive and transmit radio frequency signals; radio frequency interface circuitry 303 configured to interface the radio frequency signals received and transmitted by the antenna 301 and the data processor 306. The radio frequency interface circuitry 303 may also be known as a transceiver. The apparatus also comprises an interface 309 via which it can send and receive information to and from neighbouring eNBs and one or more other network nodes. The data processor 306 is configured to process signals from the radio frequency interface circuitry 303, control the radio frequency interface circuitry 303 to generate suitable RF signals to communicate information to the UE 6 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter.

In the LTE Rel-8/9/10 system mentioned above, downlink transmissions are made according to an orthogonal frequency division multiple access (OFDMA) technique, and uplink transmissions are made according to a single carrier frequency division multiple access (SCFDMA) technique. Each transmission is made using a group of orthogonal sub-carriers. Sub-carriers are grouped into units called resource blocks, and a communication device can make or receive transmissions using groups of resource blocks ranging up to a predetermined maximum number of resource blocks within a predetermined frequency block called a component carrier.

The bandwidth available for transmissions between a UE 8 and an eNB 2 generally comprises a plurality of component carriers; which may be contiguous or non-contiguous, and LTE Rel-8/9/10 specifies a carrier configuration involving (a) the distribution over the full carrier bandwidth of cell reference signals (CRS), as described at Section 6.10.1 of 3GPP TS 36.211 V10.4.0, and (b) the inclusion of control signalling (Physical Downlink Control Channel (PDCCH)) in a portion of each component carrier. This configuration is referred to below as the Legacy configuration, and carriers having a Legacy configuration are referred to below as Legacy carriers.

It has been proposed to operate some of the component carriers available to an eNB 2 according to different, advanced configurations with the aim of improving performance by reducing overhead and reducing interference.

Figure 4A:
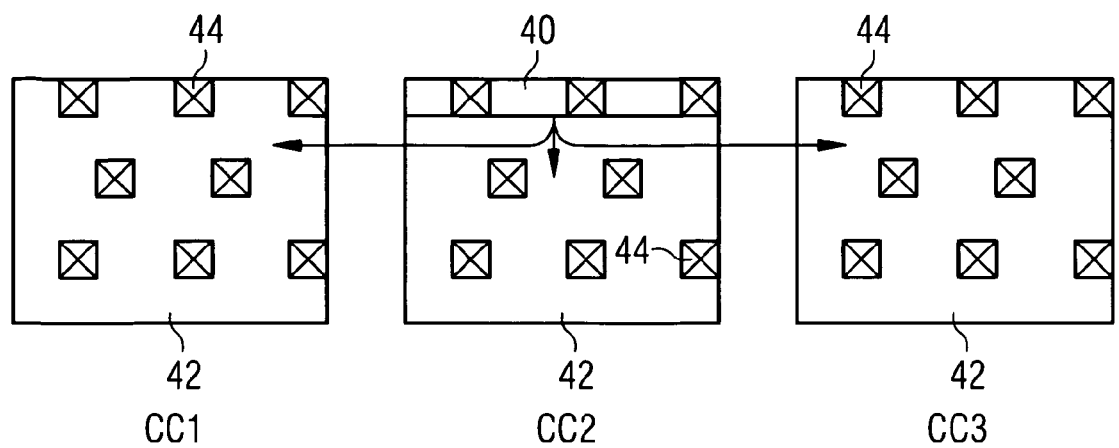
FIG. 4 illustrates examples of carriers that are not accessible to less advanced communication devices.

One example illustrated in FIG. 4(a) involves not including control signalling (PDCCH) in one or more component carriers (e.g. CC1 and CC3 in FIG. 4(a)), and instead including the control signalling (PDCCH) for those one or more component carriers (secondary cell(s)) in another component carrier (primary cell) (e.g. CC2 in FIG. 4(a)). The arrows in FIG. 4 indicate that the PDCCH 40 of FIG. 4 provides control signalling for the data channels 42 (PDSCH (physical downlink shared channel)) of all of the three carriers CC1, CC2 and CC3. CRS 44 are distributed across the width of each of the component carriers CC1, CC2 and CC3.

Figure 4B:
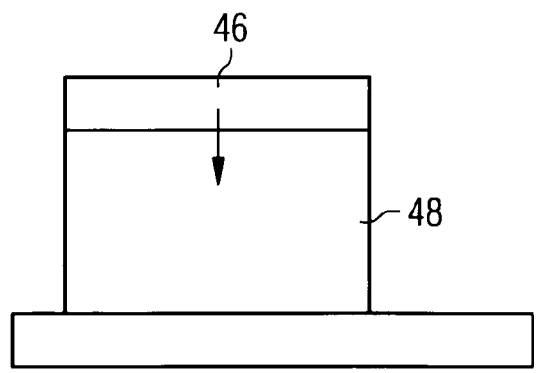

Another example illustrated in FIG. 4(b) involves including control signalling (PDCCH) 46 but not CRS 44 in a component carrier. Instead of operating a codebook-based transmission scheme involving transmitting the baseband signal together with cell-specific reference signals (CRS), eNB 2 operates an enhanced transmission scheme involving subjecting UE-specific reference signals (DM-RS) (as described at Section 6.10.3 of 3GPP TS36.211) to the same precoding as the complex-valued modulation symbols derived from the data to be transmitted; and transmitting the baseband signal derived from the DCI message together with CSI reference signals (CSI-RS) (as described at Section 6.10.5 of 3GPP TS 36.211) and the precoded UE-specific reference signals. Control channels 46 and data channels 48 transmitted according to this enhanced transmission technique are known as enhanced control and data channels (e.g. ePDCCH and ePDSCH).

Irrespective of how the advanced carrier configuration differs to the carrier configuration specified in LTE Rel-8/9/10, access to component carriers having such an advanced configuration will be limited to advanced LTE-compatible UEs having such capability, and less advanced LTE compatible UEs (legacy UEs) configured to operate only in accordance with LTE Rel-8/9/10 will not be able to access such component carriers.

Figure 5:
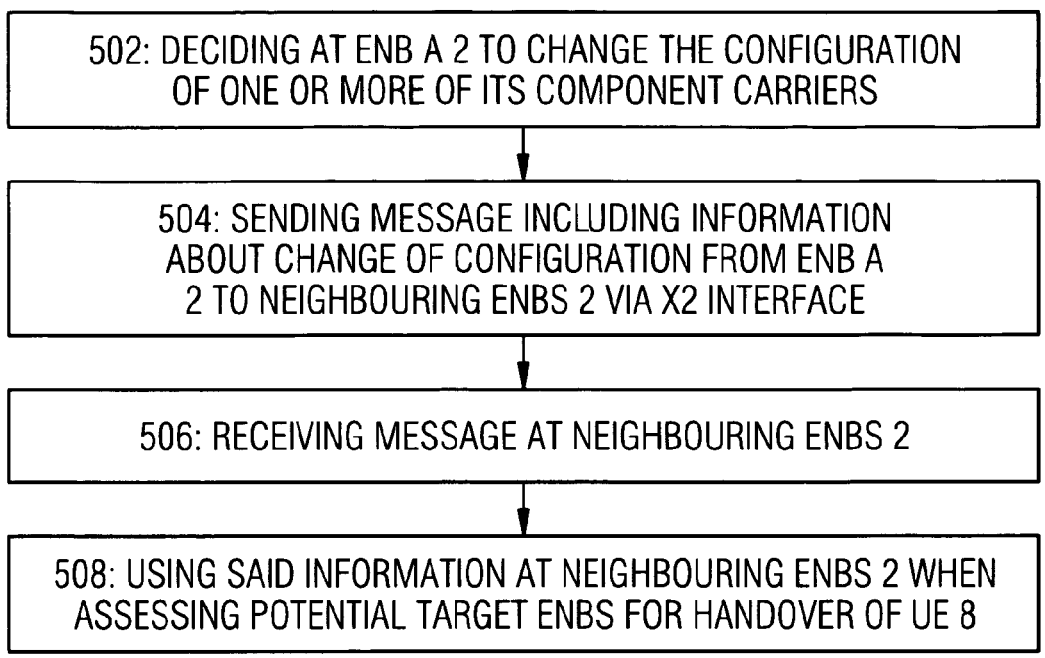
FIG. 5 illustrates an example of operations at a network access node in accordance with an embodiment of the present invention.
Figure 6:
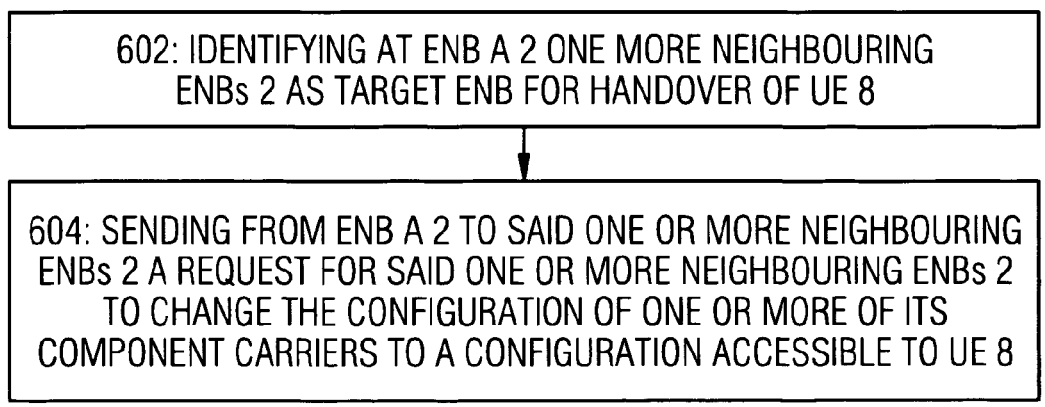
FIG. 6 illustrates another example of operations at a network access node in accordance with an embodiment of the present invention.

FIGS. 5 and 6 illustrate an example of operations at eNB 2 in a technique according to an embodiment of the present invention, which technique is aimed at facilitating the handover of a UE to or from a neighbouring eNB 2.

Each eNB 2 is configured to be capable of changing the configuration of one or more of the component carriers allocated to it. For example, eNB A 2 currently having two component carriers configured as Legacy carriers could decide to change one of those two component carriers to an advanced configuration, in response to a determination at eNB A that a single component carrier is sufficient to serve all the Legacy UEs currently served by eNB A 2. According to another example, eNB A 2 currently having one or more component carriers configured as Legacy carriers could change all of said one or more component carriers to an advanced configuration, in response to a finding that none of its UEs in RRC Connected mode are Legacy UEs. According to another example, eNB A may decide to change one or more of its component carriers from an advanced configuration to a Legacy configuration, in response to a request received from a neighbouring eNB via the X2 link that directly connects them.

When eNB A 2 decides to change the configuration of one or more of its component carriers (STEP 502), it sends a signalling message via X2 links 10 to neighbouring eNBs 2 informing them of the change (STEP 504). eNB A 2 may send a separate message for each component carrier for which a configuration change has been decided, or eNB A 2 may send a single message including details of the respective configuration for all component carriers available to eNB A 2. The information sent by neighbouring eNBs could include a time-stamp indication of the exact time of the change of carrier configuration. The neighbouring eNBs 2 receive this information from eNB A (STEP 506), and use it when assessing potential target eNBs for the handover of UE 8.

The above-described description of an embodiment of the invention is focussed on the communication between eNBs 2 of information about carrier configuration changes for the purpose of facilitating handovers between eNBs 2, but such inter eNB communications could also be used for other purposes that improve the performance of the system as a whole.

Whenever an eNB 2 decides to change the configuration of one or more of its component carriers, eNB 2 signals this change to all its UEs in RRC Connected mode. This signalling could be broadcast to the UEs 8 on the one or more carriers for which a change in configuration has been decided, or it could be conveyed using UE-specific RRC signalling. Upon receipt of this information, advanced UEs 8 adopt their operation/behaviour in accordance with the configuration change. Legacy UEs are in any case only able to access carriers in a Legacy configuration.

This signalling from eNB 2 to UEs 8 could include a time-stamp indication of the exact time at which the decided configuration change takes effect. According to one example, the time is expressed as a system frame number, which is a number that is common to all operations at UE 8 and eNB 2.

The above-description of an embodiment of the present invention relates to changing the configuration of downlink carriers, but the same technique is also applicable to uplink carriers.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method comprising:
    deciding at a first access node that a change in configuration for at least one set of radio resources allocated to said first access node among a plurality of configurations is required based on a determination of the relative need for each of the plurality of configurations by the first access node;
    sending from the first access node to one or more other access nodes neighbouring said first access node a communication about the change in configuration for at least one set of radio resources among the plurality of configurations,
    wherein the plurality of configurations includes a first configuration accessible to a first category of communication devices, but not to a second category of communication devices, and a second configuration accessible to both said first category and said second category of communication devices.

2. The method according to claim 1, wherein said communication comprises information about the decision at said first access node to make the change in configuration for said at least one set of radio resources.

3. The method according to claim 2, wherein said communication comprises information about the timing of the change in configuration for said at least one set of radio resources.

4. The method according to claim 1, wherein said communication comprises a single message including information about the configuration for a plurality of sets of radio resources.

5. The method according to claim 1, wherein said communication comprises a request to said one or more neighbouring access nodes to change the configuration of one or more sets of radio resources to said second configuration.

6. The method according to claim 5 further comprising:
    making said request in response to an identification at said first access node of said neighbouring access node as a potential target access node for the handover from said first access node to said neighbouring access node of a communication device belonging to said second category of communication devices.

7. The method according to claim 1, wherein said second configuration comprises allocating part of said set of radio resources to the transmission of reference signals required by said second category of communication devices to access control signalling or data carried on said set of radio resources.

8. The method according to claim 1, wherein said second configuration comprises allocating part of said set of radio resources to the transmission of control signalling required by said second category of communication devices to access user data carried on said set of radio resources.

9. An apparatus comprising:
a processor; and
a memory including computer program code, wherein the memory and computer program code are configured, with the processor, to cause the apparatus to:
decide at the apparatus that a change in configuration for at least one set of radio resources allocated to the apparatus among a plurality of configurations is required based on a determination of the relative need for each of the plurality of configurations by the apparatus;
send from the apparatus to one or more other access nodes neighbouring said apparatus a communication about the change in configuration for at least one set of radio resources among the plurality of configurations,
wherein the plurality of configurations includes a first configuration accessible to a first category of communication devices, but not to a second category of communication devices, and a second configuration accessible to both said first category and said second category of communication devices.

10. The apparatus according to claim 9, wherein said communication comprises information about the decision at said apparatus to make the change in configuration for said at least one set of radio resources.

11. The apparatus according to claim 10, wherein said communication comprises information about the timing of the change in configuration for said at least one set of radio resources.

12. The apparatus according to claim 9, wherein said communication comprises a single message including information about the configuration for a plurality of sets of radio resources.

13. The apparatus according to claim 9, wherein said communication comprises a request to said one or more neighbouring access nodes to change the configuration of one or more sets of radio resources to said second configuration.

14. The apparatus according to claim 13, wherein the memory and computer program code are further configured, with the processor, to cause the apparatus to:
make said request in response to an identification at said first access node of said neighbouring access node as a potential target access node for the handover from said first access node to said neighbouring access node of a communication device belonging to said second category of communication devices.

15. The apparatus according to claim 9, wherein said second configuration comprises allocating part of said set of radio resources to the transmission of reference signals required by said second category of communication devices to access control signalling or data carried on said set of radio resources.

16. The apparatus according to claim 9, wherein said second configuration comprises allocating part of said set of radio resources to the transmission of control signalling required by said second category of communication devices to access user data carried on said set of radio resources.

17. A computer program product comprising a non-transitory computer-readable storage medium bearing computer program code embodied therein for use with a computer, the computer program code comprising code for performing:
decide at a first access node that a change in configuration for at least one set of radio resources allocated to said first access node among a plurality of configurations is required based on a determination of the relative need for each of the plurality of configurations by the first access node;
send from the first access node to one or more other access nodes neighbouring said first access node a communication about the change in configuration for at least one set of radio resources among the plurality of configurations,
wherein the plurality of configurations includes a first configuration accessible to a first category of communication devices, but not to a second category of communication devices, and a second configuration accessible to both said first category and said second category of communication devices.

* * * * *